Patented June 15, 1954

2,681,359

UNITED STATES PATENT OFFICE 2,681,359

ALPHA (HYDROXYPHENYL) CYANO CINNAMONITRILES

Kurt J. Rorig, Evanston, Ill., assignor to G. D. Searle & Co., Chicago, Ill., a corporation of Illinois No Drawing. Application July 27, 1953, Serial No. 370,635

5 Claims. (Cl. 260—465)

This invention relates to a new group of phenolic dinitriles and, specifically, to the α-(hydroxyphenyl) and α-(polyhydroxyphenyl) derivatives of β-(cyanophenyl)acrylonitriles of the general structural formula

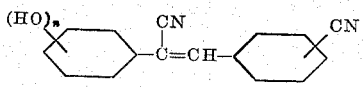

wherein $n$ is one or two.

The compounds of my invention are conveniently prepared by the alkaline condensation of a hydroxylated α-tolunitrile of the type

with a cyanobenzaldehyde. Suitable condensing agents are alkali metal alkoxides, sodamide and sodium hydroxide. Another method consists in the alkaline condensation of a methoxylated α-tolunitrile with a cyanobenzaldehyde and demethylation with anhydrous pyridine hydrochloride.

The claimed compounds provide medicinal agents which possess valuable cardiovascular effects. They antagonize the effects of the mineralocorticoid adrenal hormones. Further, they are of great value as intermediates in organic synthesis of other hormonally active and cardiovascular drugs. The phenolic hydroxy radicals can be esterified or alkylated and the resulting alkyl ethers of the type

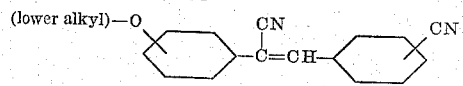

can be employed in a variety of syntheses in which the nuclear cyano group is selectively reacted without attack on the α-cyano group. Thus, treatment of α-(p-anisyl)-β-(p-cyanophenyl)acrylonitrile with a Grignard reagent of the type (lower alkyl)-Mg-halogen yields compounds of the type

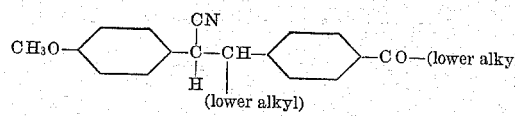

Treatment of an α-anisyl-β-(cyanophenyl)-acrylonitrile with hydrochloric acid in methanol yields

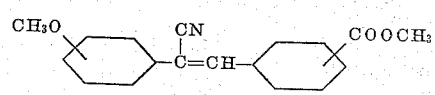

This compound is demethylated by heating with pyridine hydrochloride to form a free phenolic acid of the type

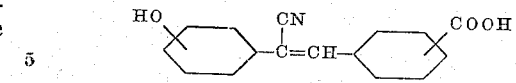

Acetylation of the phenol radical followed by treatment with thionyl chloride yields the α-(acetoxyphenyl)-β-(chloroformylphenyl)-acrylonitrile.

This chloroformyl compound, in turn, is the starting material in a number of important syntheses. Thus treatment with dimethyl cadmium yields the α-(acetoxyphenyl)-β-(acetophenyl)-acrylonitrile. Deacetylation yields the α-(hydroxyphenyl)-β-(acetophenyl)acrylonitrile

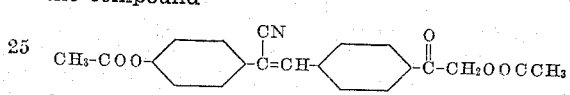

Successive treatment of α-(p-acetoxyphenyl)-β-(p-chloroformylphenyl)acrylonitrile with diazomethane, acetic acid and then with water yields the compound

CH₃-COO—⟨⟩—C(CN)=CH—⟨⟩—C(O)-CH₂OOCCH₃ deacetylation of which leads to α-(p-hydroxyphenyl)-β-(p-glycolylphenyl)acrylonitrile, a compound with adrenocorticoid properties.

The following examples illustrate in detail certain other compounds which comprise this invention and methods for producing same. However, this invention is not to be construed as limited in spirit or in scope thereby. It will be apparent to those skilled in the art that many modifications in materials and methods may be made without departing from the invention. In each of these examples, temperatures are given in degrees centigrade (° C.), relative amounts of materials in parts by weight and pressures during vacuum distillation in millimeters (mm.) of mercury.

Example 1

A mixture of 131 parts of p-cyanobenzaldehyde and 133 parts of p-hydroxytolunitrile in 400 parts of methanol is treated with a solution of 54 parts of sodium methoxide in 430 parts of methanol. Within a short time a yellowish product precipitates. The mixture is slurried while a stream of gaseous hydrogen chloride is passed through it to liberate the free phenolic compound. A mixture of this product and sodium chloride is collected on a filter. The sodium chloride is removed by washing with water. Upon repeated recrystallization of the organic residue from absolute ethanol, the α-(p-hydroxyphenyl)-β-(p-cyanophenyl)acrylonitrile melts at about 219–220° C. It has the structural formula

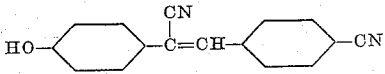

The infrared spectrum shows characteristic maxima at 2.80, 4.48, 6.26, and 11.94 microns.

Example 2

Upon addition of a solution of 54 parts of sodium methoxide in 430 parts of methanol to a solution of 131 parts of p-cyanobenzaldehyde and 147 parts of p-methoxytolunitrile in 400 parts of methanol, an almost instantaneous precipitation of a yellow product begins. This product turns brown on standing in the alkaline solution but becomes yellow once more on coming in contact with air. The precipitate is collected on a filter and washed with methanol to yield a yellow solid. After successive recrystallization from ethanol and acetone the α-(p-anisyl)-β-(p-cyanophenyl)-acrylonitrile is obtained in very slender, lemon-colored needles melting at about 174–175° C.

The same product is obtained by the treatment of α-(p-hydroxyphenyl)-β-(p-cyanophenyl)acrylonitrile with diazomethane. A sample of mixed crystals shows no depression in melting point.

Example 3

A mixture of 640 parts of 4-N etheric methyl magnesium bromide, 570 parts of ether and 2200 parts of benzene is heated to 50° C. and then treated under a nitrogen atmosphere with a slurry of 261 parts of α-(p-methoxyphenyl)-β-(p-cyanophenyl)acrylonitrile in 2000 parts of benzene. After subsidence of the initial exothermic reaction, the mixture is heated under reflux with stirring for 12 hours. 1200 parts of concentrated hydrochloric acid in 1500 parts of water are added and the biphasic mixture is refluxed for 15 minutes. The aqueous layer is separated and the remainder is evaporated to yield a heavy yellow oil. On standing, the aqueous material develops an oily layer which is extracted with benzene; evaporation of the extract yields an additional quantity of the oily product. The combined oily products are taken up in benzene and applied to a silica gel chromatography column. The column is successively eluted with benzene and with a 5% solution of ethyl acetate in benzene. It is then eluted repeatedly with a 15% solution of ethyl acetate in benzene and these eluates are evaporated under vacuum until crystallization begins. The hot mixture is treated with one-third of its volume of hot petroleum ether. The crystals are collected on a filter and recrystallized from a mixture of benzene and petroleum ether. The α-(p-anisyl)-β-(p-acetophenyl)butyronitrile thus obtained melts at about 124–126° C. The ultraviolet absorption spectrum shows maxima at 230 and 252 millimicrons. The infrared spectrum shows maxima at 4.44, 5.96, 7.88, 9.65, and 11.97 microns. The product has the structural formula

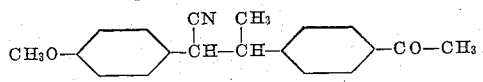

Example 4

A suspension of 56.5 parts of α-(p-anisyl)-β-(p-cyanophenyl)acrylonitrile in 2000 parts of methanol is heated at reflux and treated with a gaseous stream of hydrogen chloride for 3½ hours. 100 parts of water are added and refluxing is continued for 15 minutes. The hot reaction liquors are filtered and the precipitate is collected and recrystallized from a minimal amount of methanol. The methyl ester of α-(p-anisyl)-β-(p-carboxyphenyl)acrylonitrile thus obtained melts at about 129–130° C. It has the structural formula

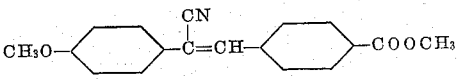

Refluxing of 10 parts of the above ester with 40 parts of pyridine hydrochloride for 45 minutes yields α-(p-hydroxyphenyl)-β-(p-carboxyphenyl)acrylonitrile which, recrystallized from ethanol, melts at about 293–295° C.

Example 5

A mixture of 262 parts of m-cyanobenzaldehyde and 266 parts of o-hydroxytolunitrile in 800 parts of methanol is stirred with a solution of 108 parts of sodium methoxide in 900 parts of methanol. After standing at room temperature for an hour, the reaction mixture is stirred and treated with a stream of gaseous hydrogen chloride. The precipitate is collected on a filter and freed from sodium chloride by washing with water. The α-(o-hydroxyphenyl)-β-(m-cyanophenyl)-acrylonitrile forms fine lemon-colored rhomboid needles. The infrared absorption spectrum shows maxima at 2.82 and 4.50 microns. This product has the structural formula

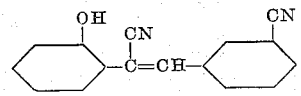

Example 6

A solution of 27 parts of sodium methoxide in 220 parts of methanol is added to a mixture of 66 parts of p-cyanobenzaldehyde and 68 parts of m,p-dihydroxytolunitrile in 200 parts of methanol. After standing for an hour, the mixture is slurried and treated with gaseous hydrogen chloride. The precipitate is then collected on a filter and freed from inorganic material by washing with water. The α-(m,p-dihydroxyphenyl)-β-(p-cyanophenyl)acrylonitrile can be purified by vacuum distillation at about 250° C. and about 0.005 mm. pressure. The infrared absorption spectrum shows maxima at 2.79, 4.49, and 6.26 microns. The compound has the structural formula

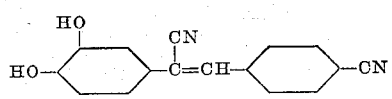

I claim:
1. A compound of the structural formula

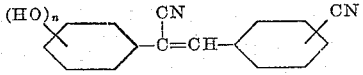

wherein n is a positive integer smaller than three.

2. A compound of the structural formula

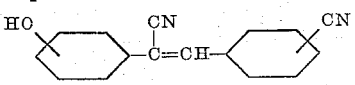

3. α-(p-Hydroxyphenyl)-β-(p-cyanophenyl)acrylonitrile.

4. An α-(dihydroxyphenyl)-β-(cyanophenyl)acrylonitrile.

5. α-(m,p-Dihydroxyphenyl)-β-(p-cyanophenyl)acrylonitrile.

No references cited.